United States Patent
Cheng et al.

(10) Patent No.: US 9,319,581 B2
(45) Date of Patent: Apr. 19, 2016

(54) IMAGE EDITING METHOD AND ASSOCIATED APPARATUS

(71) Applicant: MStar Semiconductor, Inc., Hsinchu Hsien (TW)

(72) Inventors: Kun-Nan Cheng, Hsinchu County (TW); Yu-Chuan Shen, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 76 days.

(21) Appl. No.: 14/250,981

(22) Filed: Apr. 11, 2014

(65) Prior Publication Data

US 2014/0307977 A1 Oct. 16, 2014

(30) Foreign Application Priority Data

Apr. 15, 2013 (TW) .............................. 102113223 A

(51) Int. Cl.
*G06K 9/40* (2006.01)
*H04N 5/232* (2006.01)

(52) U.S. Cl.
CPC .............. *H04N 5/23212* (2013.01); *G06K 9/40* (2013.01); *H04N 5/23229* (2013.01)

(58) Field of Classification Search
CPC .................. G06T 15/00; G06T 2207/10052; G06T 5/003; G06T 2207/1014; G06T 2207/10148; G06T 7/0069; G06T 2207/20192; H04N 5/2254; H04N 5/23212; H04N 13/0235; H04N 5/23219; H04N 5/217; H04N 13/0025; H04N 1/4092; G02B 27/0075; G02B 13/20; G02B 21/244; G02B 21/365; G02B 27/2228; A61B 3/08

USPC ............ 382/103, 154, 173, 255, 261; 348/46, 348/121, 169, 241, 362; 345/46, 241
See application file for complete search history.

(56) References Cited

U.S. PATENT DOCUMENTS

| 8,000,521 | B2 * | 8/2011 | Kira | G02B 27/2228 |
| | | | | 359/462 |
| 2002/0191100 | A1 * | 12/2002 | Matsunaga | H04N 5/23212 |
| | | | | 348/345 |
| 2006/0013479 | A1 * | 1/2006 | Trimeche | H04N 9/045 |
| | | | | 382/167 |
| 2007/0070360 | A1 * | 3/2007 | Cheng | G02B 21/0028 |
| | | | | 356/630 |
| 2007/0172141 | A1 * | 7/2007 | Bando | H04N 1/4092 |
| | | | | 382/261 |

(Continued)

FOREIGN PATENT DOCUMENTS

| TW | 201044091 | 12/2010 |
| TW | 201131512 | 9/2011 |

OTHER PUBLICATIONS

Taiwan Intellectual Property Office, "Office Action," Apr. 21, 2015.

*Primary Examiner* — Nirav G Patel
*Assistant Examiner* — Aklilu Woldemariam
(74) *Attorney, Agent, or Firm* — WPAT, P.C.; Justin King; Douglas A. Hosack

(57) ABSTRACT

An image editing method for editing an original image is provided. The original image has a distinct figure and an indistinct figure, which correspond to an in-focus object and an out-of-focus object, respectively. The image editing method includes: obtaining an out-of-focus object distance from the out-of-focus object to a lens; performing an inverse blurring process on the indistinct figure according to the out-of-focus object distance and an optical parameter to obtain a processed figure; and forming a processed image according to the processed figure and the distinct figure.

16 Claims, 8 Drawing Sheets

(56) References Cited

U.S. PATENT DOCUMENTS

| | | | |
|---|---|---|---|
| 2011/0007176 A1* | 1/2011 | Hamano | H04N 5/23212 348/222.1 |
| 2011/0267507 A1* | 11/2011 | Kane | G02B 27/0075 348/241 |
| 2013/0088489 A1* | 4/2013 | Schmeitz | H04N 5/2254 345/419 |
| 2013/0188019 A1* | 7/2013 | Christopher | H04N 13/0235 348/46 |
| 2013/0216125 A1* | 8/2013 | Shroff | H04N 5/2254 382/154 |
| 2014/0177905 A1* | 6/2014 | Grefalda | G06K 9/78 382/103 |

\* cited by examiner

IMAGE EDITING METHOD AND ASSOCIATED APPARATUS

This application claims the benefit of Taiwan application Serial No. 102113223, filed Apr. 15, 2013, the subject matter of which is incorporated herein by reference.

BACKGROUND OF THE INVENTION

1. Field of the Invention

The invention relates in general to an image processing method and an associated apparatus, and more particularly to a method for processing an original image generated by a digital camera through photographing, and an associated apparatus.

2. Description of the Related Art

With fast developments of image capturing technologies, digital cameras have become indispensible electronic devices in the daily life. To handily operate digital cameras, common consumer cameras (shoot cameras or cameras equipped in cell phones) have a deeper depth of field, and can easily capture clear images.

Professional cameras (e.g., single-lens reflex cameras) have a larger aperture and a shallower depth of field, and need to be operated by users with high photographing skills. Images captured by single-lens reflex cameras offer a greater layering effect, whereas consumer cameras are incapable of providing such photographing effect similar to that of professional cameras.

As commonly known, when operating a professional camera, various parameters need to be set, e.g., focusing, lens filter, lens focal length, aperture value and exposure time. Inappropriate settings of the parameters may cause an object captured to be located outside a target depth of field, such that a figure in a photographed image may appear indistinct rather than yielding originally intended distinctness.

Therefore, it is an object of the present invention to process an indistinct figure in an original image to a distinct figure or to another different indistinct figure.

SUMMARY OF THE INVENTION

According to an embodiment of the present invention, an image editing method for editing an original image is provided. The original image at least has a distinct figure and an indistinct figure, which correspond to an in-focus object and an out-of-focus object photographed, respectively. The image editing method includes: obtaining an out-of-focus object distance from the out-of-focus object to a lens; performing an inverse blurring process on the indistinct figure according to the out-of-focus object distance and an optical parameter to obtain a processed figure; and forming a processed image according to the processed figure and the distinct figure.

According to another embodiment of the present invention, an image editing method for editing an original image is provided. The original image at least has an original figure, and an indistinct figure that corresponds to a photographed object. The image editing method includes: obtaining an object distance from the photographed object and a lens; obtaining a camera shift amount; performing an inverse blurring process on the indistinct figure according to the object distance, the camera shift amount and an optical parameter to form a processed figure; and forming a processed image according to the processed figure and the original figure.

According to another embodiment of the present invention, an image editing apparatus that edits an original image generated by a lens through photographing is provided. The image processing apparatus includes a processor and a distance detecting unit. From the original image, the processor identifies a distinct figure and an indistinct, which correspond to an in-focus object and an out-of-focus object photographed, respectively. The distance detection unit obtains an out-of-focus object distance from the out-of-focus object to the lens. The processor performs an inverse blurring process on the indistinct figure according to the out-of-focus object distance and an optical parameter of the lens to obtain a processed figure, and further forms a processed image according to the processed figure and the distinct figure.

The above and other aspects of the invention will become better understood with regard to the following detailed description of the preferred but non-limiting embodiments. The following description is made with reference to the accompanying drawings.

DETAILED DESCRIPTION OF THE INVENTION

Geometrical optics is briefly described below to introduce the image formation principle of a camera and associated influences on an in-focus object and an out-of-focus object.

Figure 1A:
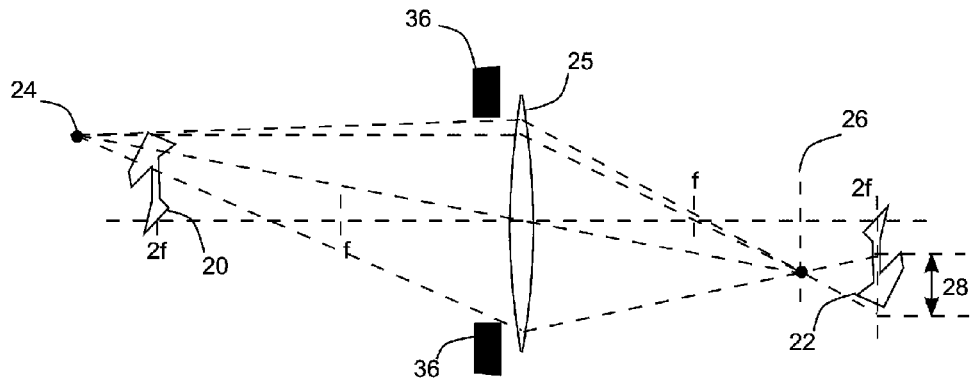
FIG. 1A is image formation of an in-focus object and bokeh produced by an out-of-focus dot light source.

FIG. 1A shows image formation of an in-focus object 20 and bokeh produced by an out-of-focus dot light source. Bokeh is the part in the image that is located outside the focus.

A focal length f of a capturing lens 25 is f, and an in-focus object 20 is at a position that is twice the focal length f (i.e., 2f) at a first side of the capturing lens 25. Deduced from simple optical theories, a real image 22 having a same size is generated at a position that is twice the focal length f (i.e., 2f) at a second side of the capturing lens 25. In other words, by moving an optical sensor of the camera to the position of the real image 22 at the second side of the capturing lens 25, a distinct figure of the in-focus object 20 can be obtained.

Assume that the focal length of the capturing lens 25 is f, a distance from the in-focus object 20 to the capturing lens 25 is Dn, and a distance from the real image 22 to the capturing lens 25 is In. The above relationship needs to satisfy the Lensmaker's equations, i.e., $(1/Dn)+(1/In)=(1/f)$.

According to the above principle, after having determined the distance from the in-focus object 20 to the capturing lens 25 in a focusing process of the camera, the correct image formation position In of the real image 22 can be calculated according to the focal length of the capturing lens 25. Thus, the real image 22 of the in-focus object 20 can be obtained after moving the optical sensor in the camera to the position In.

A dot light source 24 in FIG. 1A is located beyond twice the focal length f (i.e., 2f) at the first side of the capturing lens 25. According to the Lensmaker's equation, an image formation position 26 of the dot light source 24 is located at a position that is between one focal length and twice the focal length. However, to obtain a distinct figure of the in-focus object 20, the optical sensor in the camera falls at a position that is twice the focal length f (i.e., 2f) at the second side. As such, a part of beams emitted from the dot light source 24 pass through an aperture 36, focus at the image formation position 26, and diffuses into an indistinct figure having a certain range on the optical sensor, thereby forming bokeh. The range of the indistinct figure is denoted as 28 in FIG. 1A.

It is known from FIG. 1A that, as the dot light source 24 gets farther away from the in-focus object 20 and the capturing lens 25, the image formation position 26 of the dot light source 24 gets closer to the focal length f at the second side of the capturing lens 25, the indistinct figure becomes larger, and brightness, clarity and contrast of the indistinct figure get poorer.

Figure 1B:
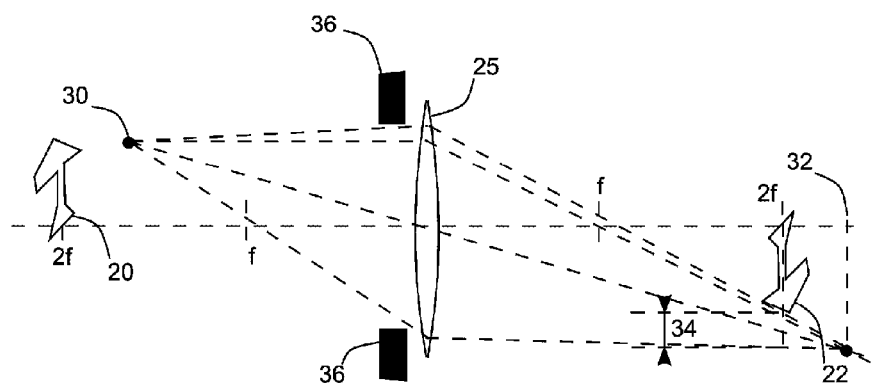
FIG. 1B shows a dot light source located between one focal length f and twice the focal length f (i.e., 2f) at a first side of a capturing lens.

In FIG. 1B, the in-focus object 20 is at a position twice the focal length f (i.e., 2f) at the first side of the capturing lens 25, and a dot light source 30 is located between twice the focal length f (i.e., 2f) and one focal length f at the first side of the capturing lens 25. According to the Lensmaker's equation, an image formation position 32 of the dot light source 30 is expectedly located beyond twice the focal length f (i.e., 2f) at the second side. Similar to the result in FIG. 1A, in the optical sensor in the camera, the dot light source 30 also produces an indistinct figure, whose range is denoted as 34 in FIG. 1B. As the dot light source 30 gets farther away from the in-focus object 20 and closer to the capturing lens 25, the image formation position 32 gets farther away from the capturing lens 25, and the indistinct figure becomes larger.

Figure 1C:
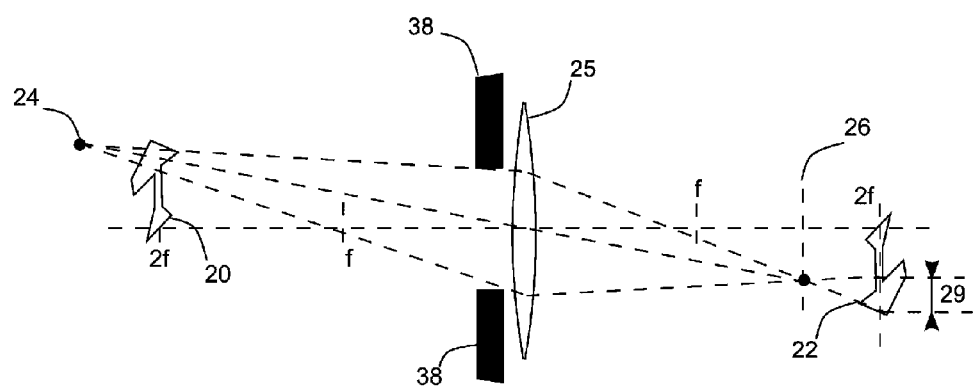
FIG. 1C shows bokeh produced by a larger aperture.

FIG. 1C is similar to FIG. 1A, with the aperture value being the only difference between the two. The aperture 36 in FIG. 1A is larger than an aperture 38 in FIG. 1C. In FIG. 1C, the range of the indistinct figure is denoted as 29. By comparing FIG. 1A with FIG. 1C, the range of bokeh reduces as the aperture gets smaller. Also by comparing the two, it is known that the shape of the indistinct figure in the bokeh is affected by the shape of the aperture. For example, assume that the aperture has six leaves, the shape of an optical path formed by the leaves may appear hexagonal, and the indistinct figure formed on the optical sensor may then appear as a hexagram figure.

Further concluded from FIGS. 1A, 1B and 1C, a result of bokeh is associated with the optical parameters of the capturing lens 25, the position of the dot light source and the position of the in-focus object. The optical parameters of the capturing lens 25 include the focal length f, the size and shape of the aperture, and optical transmittance. The position of the in-focus object is equivalent to the position of the optical sensor, and the relationship between the two needs to satisfy the Lensmaker's equation.

Figure 2:
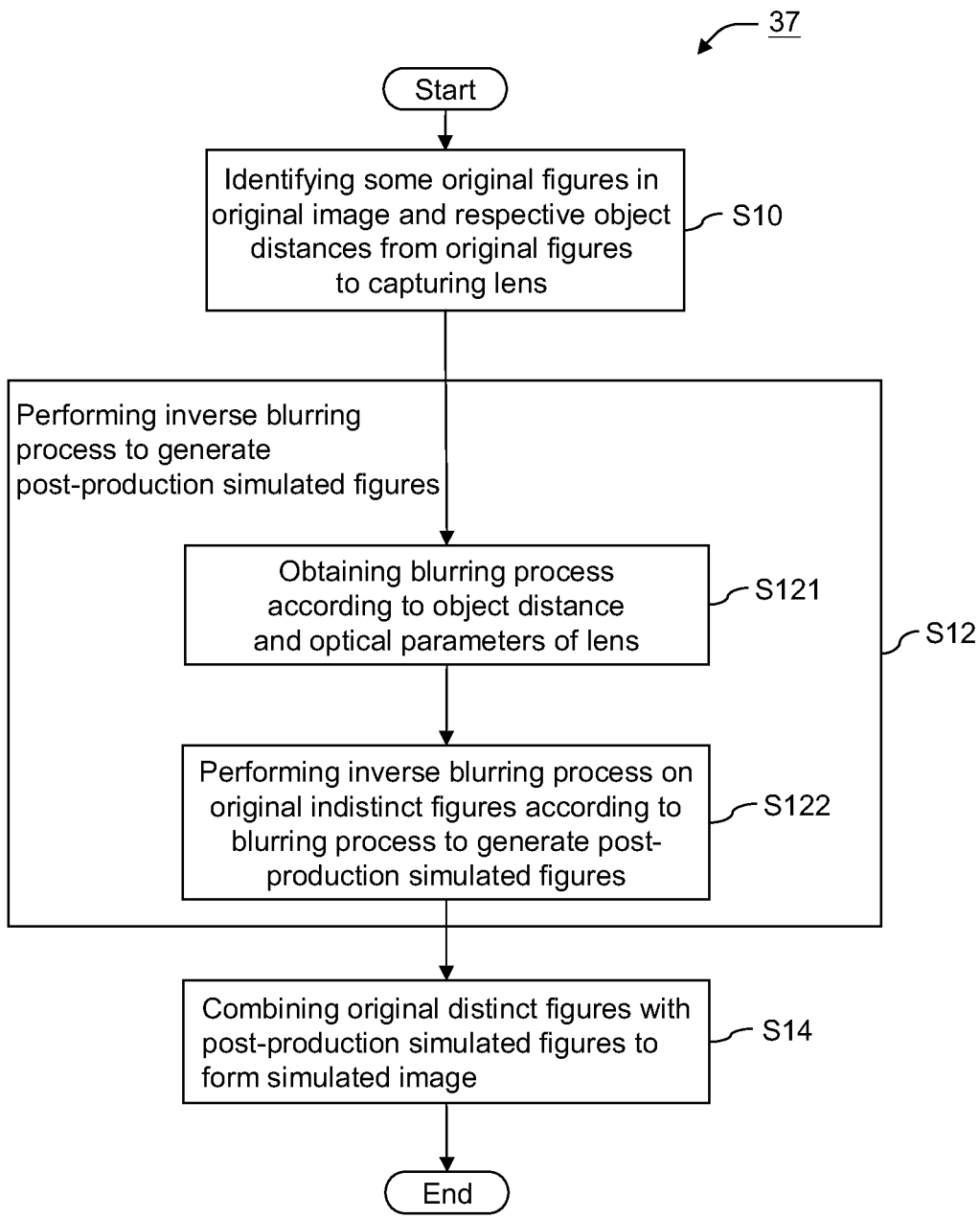
FIG. 2 is an image editing method according to an embodiment of the present invention.

FIG. 2 shows an image editing method 37 according to an embodiment of the present invention. In one embodiment, the image editing method 37 is implemented in a photographing device (e.g., a camera), or a computer system, to serve as post-imaging software. The post-imaging software may be provided by a camera lens manufacturer, and is dedicated for processing original images that a camera generates through photographing.

In step S10, multiple original figures in an original image, and respective object distances from objects corresponding to the original figures to a capturing lens are identified. For example, some of the original figures are distinct whereas others are indistinct. The photographed objects corresponding to the original distinct figures are referred to as in-focus objects, and the photographed objects corresponding to the original indistinct figures are referred to out-of-focus objects. In step S12, an inverse blurring process is performed on some of the original indistinct figures to generate post-production simulated figures. These post-production simulated figures are theoretically more distinct than the original indistinct figures. In step S14, the original distinct figures and the post-production simulated figures are combined to form a simulated image.

In one embodiment, step S12 includes steps S121 and S122. In step S121, a blurring process may be obtained according to numerous optical parameters of the capturing lens and the object distances. For example, assume that the aperture of the capturing lens virtually becomes infinitely small (similar to a pinhole camera). At this point, bokeh may be completely omitted, and a virtual image consisted of virtual distinct figures may be formed on the optical sensor, regardless of whether the photographed object is in-focus or out-of-focus. Each out-of-focus object may be regarded as a combination of multiple dot light sources. The original indistinct figures in the original image may be considered as results yielded from processing the virtual distinct figures corresponding to the out-of-focus object by a blurring process. Such blurring process, similar to reasons forming bokeh as previously explained, is associated with the optical parameters of the capturing lens, the position of the out-of-focus object and the position of the in-focus object. For example, the blurring process may be obtained through a look-up table (LUT) or theoretical deduction.

In step S122, the inverse blurring process is performed on the original indistinct figures according to the blurring process to generate the post-production simulated figures. Since the blurring process and the original indistinct figures are known, mathematical analysis methods such as solving simultaneous equations, reverse derivation or reverse deduction can be utilized to learn how a post-production simulated figure generates an original indistinct figure by the blurring process. Theoretically, the post-production simulated figure may be similar or equal to a virtual distinct figure corresponding to an out-of-focus object.

Figure 3A:
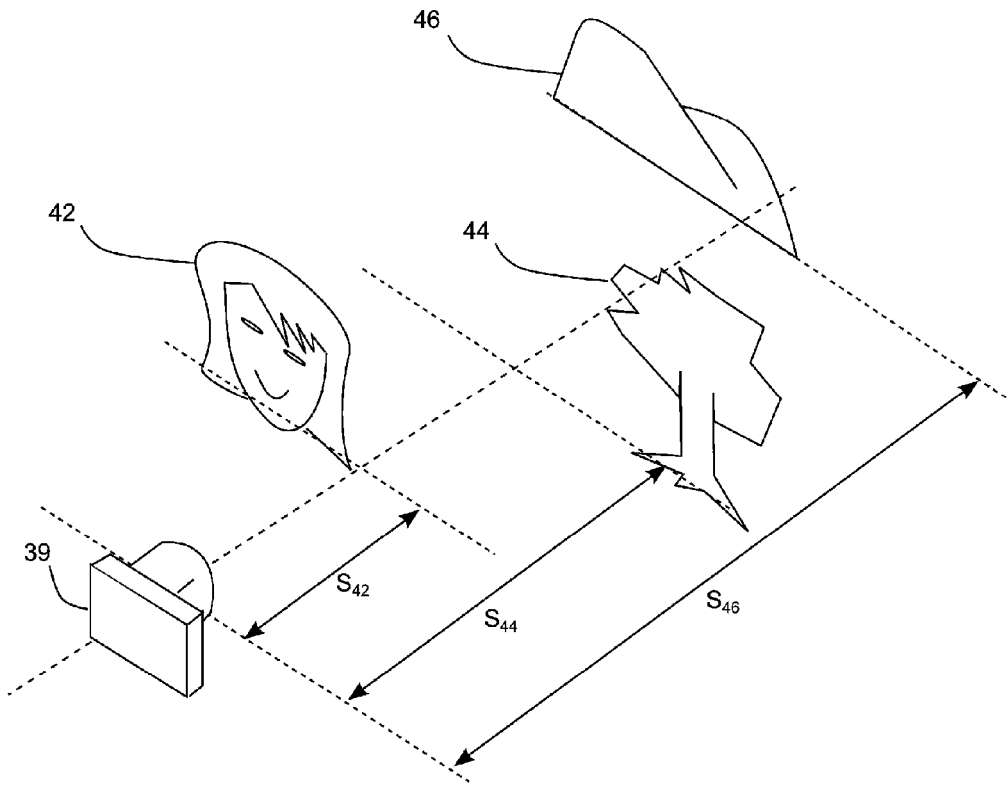
FIG. 3A shows a face, a tree and a distance mountain photographed by a camera.
Figure 3B:
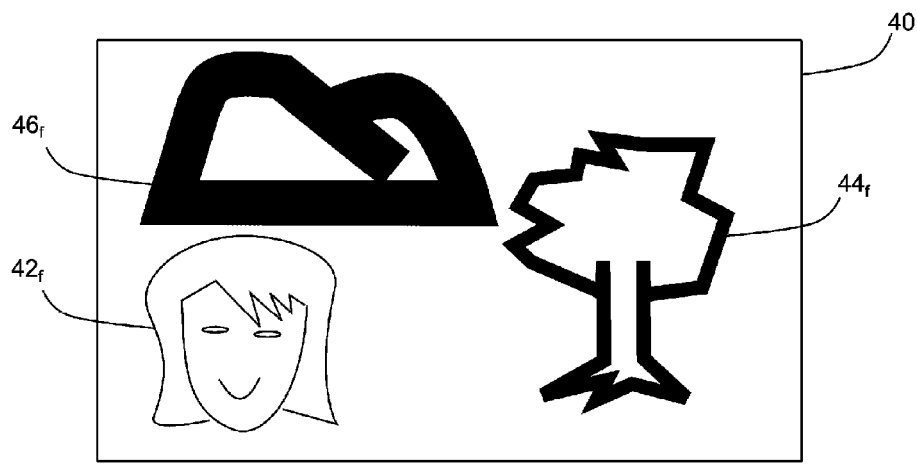
FIG. 3B is an original image generated by a camera.

FIG. 3A shows a camera 39 capturing a face 42, a tree 44 and a distant mountain 46. FIG. 3B shows an original image 40 that the camera 39 generates under predetermined optical parameters such as predetermined focal length, aperture and optical transmittance. In the original image 40, a face figure $42_f$, a tree figure $44_f$ and a distant mountain figure $46_f$ can be identified. As shown in the original image 40, it is assumed that the face 42 is an in-focus object, and the tree 44 and the distant mountain 46 are out-of-focus objects. In step S10 in FIG. 2, respective distances $S_{42}$, $S_{44}$ and $S_{46}$ from the face 42, the tree 44 and the distant mountain 46 to the camera 39 are identified, as shown in FIG. 3A.

Figure 3C:
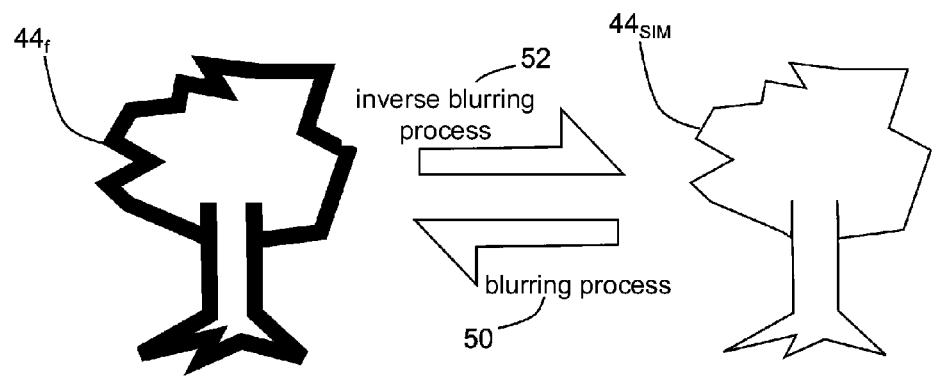
FIG. 3C shows a relationship between a tree figure in an original image and a simulated tree figure generated from simulation.

FIG. 3C shows a relationship between the tree figure $44_f$ and a simulated tree figure $44_{SIM}$. The tree figure $44_f$ is obtained from performing a blurring process 50 on the simulated tree figure $44_{SIM}$, and the simulated tree figure $44_{SIM}$ can be obtained from performing an inverse blurring process 52 on the tree figure $44_f$. According to the distances $S_{42}$ and $S_{44}$ as well as some optical parameters in the camera 39, the blurring process 50 in FIG. 3C may be learned. An inverse function of the blurring process 50 is the inverse blurring process 52. Thus, according to the distances $S_{42}$ and $S_{44}$, the optical parameters in the camera 39, and the tree figure $44_f$, the simulated tree figure $44_{SIM}$ can be deduced by step S12 in FIG. 2. Similarly, the simulated distant mountain figure $46_{SIM}$ can also be deduced.

Figure 3D:
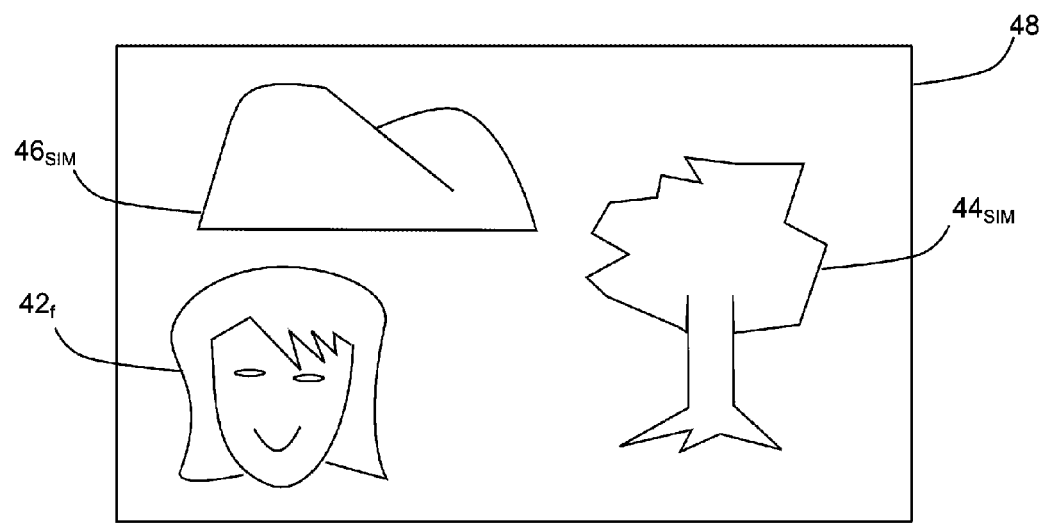
FIG. 3D is a simulated image formed after combining a face figure, a simulated tree figure and a simulated distant mountain figure.

Referring to FIG. 3D, according to step S14 in FIG. 2, the face figure $42_f$, the simulated tree figure $44_{SIM}$ and the simulated distant mountain figure $46_{SIM}$ are combined to form a simulated image 48. As shown in FIG. 3D, the simulated tree figure $44_{SIM}$ and the simulated distant mountain figure $46_{SIM}$ replace the tree figure $44_f$ and the distant mountain figure $46_f$, respectively.

Details for determining object distances are to be described. In one embodiment, respective distances from objects to a capturing lens may be obtained by a distance detecting unit (e.g., an infrared distance detecting unit). For example, an infrared distance detecting unit transmits infrared beams to all the photographed objects and accordingly obtains respective distances from the objects to the detecting unit. The distance detecting unit may be mounted on a camera. Alternatively, multiple consecutive images are captured in a high speed while the focal point is adjusted by the same lens, and the respective distances from the objects to the capturing lens are obtained according to the focal position and distinctness levels of the corresponding figures. Alternatively, according to refraction differences of wavelengths of different colors passing through a lens, e.g., minute differences of RGB colors that pass through a focal point of a lens, the respective distances can be determined according to distinctness levels of the corresponding RGB figures. Alternatively, according to the rule of thumb, e.g., a figure of a closer object is greater than a figure of a farther object, or according to a sequential relationship of all the objects, the respective distances from all of the objects and the capturing lens can be calculated.

Figure 4:
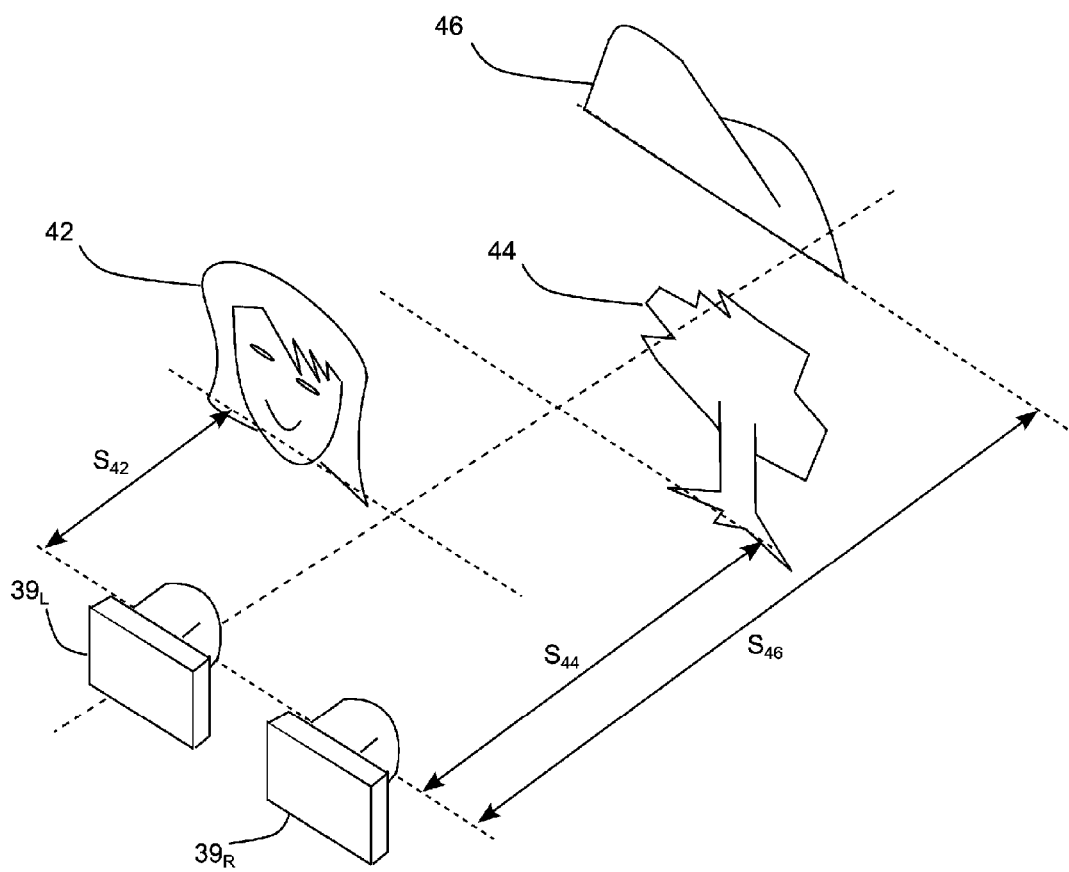
FIG. 4 shows a face, a tree and a distance mountain captured by two cameras.
Figure 5:
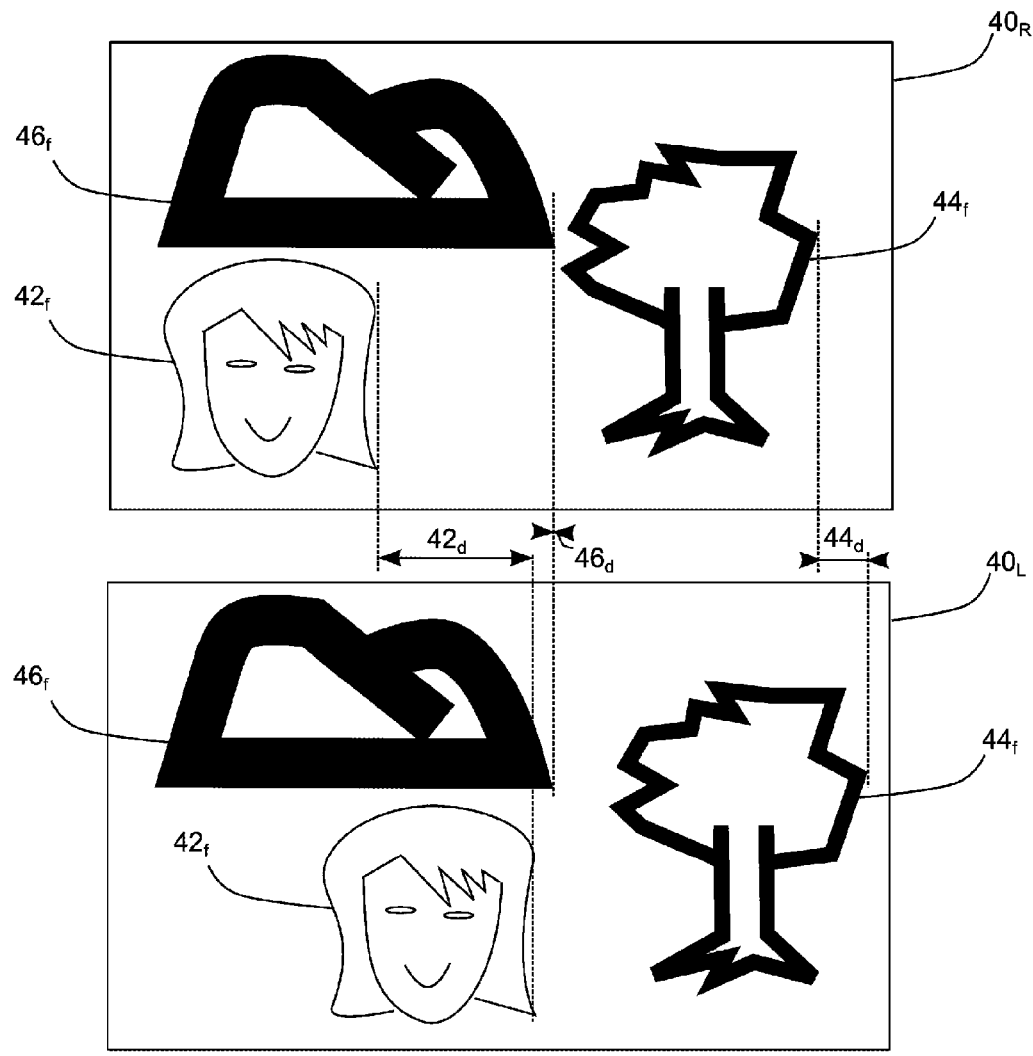
FIG. 5 shows respective original images generated by two cameras.

In one embodiment of the present invention, a distance from an object to a capturing lens may be confirmed through two original images. FIG. 4 shows two cameras $39_L$ and $39_R$ that replace the camera 39 in FIG. 3A. The two cameras $39_L$ and $39_R$ are spaced by a certain distance. FIG. 5 shows original images $40_L$ and $40_R$ generated by the cameras $39_L$ and $39_R$, respectively.

As the cameras $39_L$ and $39_R$ are spaced by a certain distance, the original images $40_L$ and $40_R$ are nevertheless slightly different although appear quite similar. Compared to the face figure $42_f$ in the original image $40_L$, the face figure $42_f$ in the original image $40_R$ is shifted to the left by a horizontal shift amount $42_d$. Similarly, a horizontal shift amount $44_d$ is present between the positions of the tree figure $44_f$ in the original images $40_L$ and $40_R$. However, the positions of the distance mountain figure $46_f$ in the original images $40_L$ and $40_R$ are hardly changed, with a horizontal shift amount $46_d$ between the two equal to almost 0. Known from FIG. 5, the horizontal shift amount $42_d >$ the horizontal shift amount $44_d >$ the horizontal shift amount $46_d$.

As shown in FIG. 4, the distance $S_{46} >$ the distance $S_{44} >$ the distance $S_{42}$. In other words, the horizontal shift amount of a figure in the two original images $40_L$ and $40_R$ in FIG. 5 and the distance from the corresponding object to the cameras $39_L$ and $39_R$ are correlated by a certain relationship. Given the horizontal shift amount of an original figure in the two original images $40_L$ and $40_R$, the distance from the corresponding object to the camera can be determined. In equivalence, the horizontal shift amount is a three-dimensional (3D) depth, which represents a distance from the corresponding object to a camera. The above approach for obtaining the 3D depth is an example for explaining the present invention, not limiting the present invention.

The original images $40_L$ and $40_R$ need not be necessarily generated by two cameras. For example, a same scene may be simultaneously photographed by a camera having two capturing lenses. Pixel counts or resolutions of the two original images may not be necessarily equal. For example, one of the two original images may have a higher resolution to serve for generating a simulated image in image processing, and the other may have a lower resolution to simply serve for comparison with the high-resolution original image and to further determine the distance from the object to the camera.

Alternatively, two images may also be obtained by one single capturing lens that photographs a same scene while moving left and right at a high speed. Thus, in the original image, the horizontal shift amount of the original figure caused by the lens moving left and right can be utilize as the reference for determining the distance from all of the objects to a lens to be simulated.

Details of the inverse blurring process are to be described. Assume that an out-of-focus dot light source generates a figure on an optical sensor under a virtual condition of no bokeh. The figure is represented by a 5×5 pixel array $POINT_{SHARP}$ as below:

$$POINT_{SHARP} = \begin{bmatrix} 0 & 0 & 0 & 0 & 0 \\ 0 & 0 & 0 & 0 & 0 \\ 0 & 0 & 1 & 0 & 0 \\ 0 & 0 & 0 & 0 & 0 \\ 0 & 0 & 0 & 0 & 0 \end{bmatrix}$$

Under certain optical parameters, it is assumed that this out-of-focus dot light source generates another figure on the optical sensor due to the bokeh effect. This another figure is represented by a 5×5 pixel array $POINT_{REAL}$ exemplified below:

$$POINT_{REAL} = 1/29 \times \begin{bmatrix} 0 & 0 & 1 & 0 & 0 \\ 0 & 2 & 3 & 2 & 0 \\ 1 & 3 & 5 & 3 & 1 \\ 0 & 2 & 3 & 2 & 0 \\ 0 & 0 & 1 & 0 & 0 \end{bmatrix}$$

Such bokeh effect may be regarded as a result of performing a blurring process on the pixel array $POINT_{SHARP}$ according to a blurring function $H(f, A, S_p, S_{sharp})$ where $f$, $A$, $S_p$ and $S_{sharp}$ represent the focal length, the aperture, the position of the dot light source, and the position of the in-focus object (equivalent to the position of the optical sensor), respectively. In the above example, it can be defined that $POINT_{REAL} = POINT_{SHARP} \otimes H(f, A, S_p, S_{sharp})$, where $\otimes$ represents convolution. Under the above conditions, the blurring function $H(f, A, S_p, S_{sharp})$ can be obtained:

$$H(f, A, S_p, S_{sharp}) = 1/29 \times \begin{bmatrix} 0 & 0 & 1 & 0 & 0 \\ 0 & 2 & 3 & 2 & 0 \\ 1 & 3 & 5 & 3 & 1 \\ 0 & 2 & 3 & 2 & 0 \\ 0 & 0 & 1 & 0 & 0 \end{bmatrix}$$

As previously stated, the blurring function H is associated with the optical parameters, the position of the out-of-focus dot light source and the position of the in-focus object. For example, the blurring function H changes as the position of the out-of-focus dot light source changes.

A photographed object may be regarded as a combination of dot light sources. Assuming that in a situation without bokeh, an out-of-focus object forms a distinct simulated figure that is represented by a pixel array $P_{SHARP}$ on an optical sensor. Assuming that in a situation with bokeh, the out-of-focus object forms an indistinct original figure that is represented by a pixel array $P_{REAL}$ on the optical sensor. The pixel arrays $P_{SHARP}$ and $P_{REAL}$ are correlated by equation (1) below:

$$P_{REAL} = P_{SHARP} \otimes H(f, A, S_p, S_{sharp})$$

The above equation may be simplified into:

$$P_{REAL} = P_{SHARP} \otimes H \quad (1)$$

Assume that an inverse blurring function G satisfies the condition of $H \otimes G = 1$, where 1 is a unit matrix; that is, in the matrix, only one element is 1 while all the other elements are 0. It is derived from equation (1):

$$\begin{aligned} P_{REAL} \otimes G &= (P_{SHARP} \otimes H) \otimes G \\ &= P_{SHARP} \otimes (H \otimes G) \\ &= P_{SHARP} \otimes 1 = P_{SHARP} \end{aligned}$$

That is, $P_{REAL} \otimes G = P_{SHARP}$.

In other words, given the inverse blurring function G, the original figure (represented by the original pixel array $P_{REAL}$) having the bokeh effect can be processed by an inverse blurring process according to the inverse blurring function G, and the simulated figure can be reversely deduced. Theoretically, the simulated figure is represented by the pixel array $P_{SHARP}$ that is more distinct.

In practice, the inverse blurring function G may be nonexistent due to factors such as a zero divisor or over-complications. However, from perspectives of numerical analysis, under a condition of analyzing a minimum error function, gradient iteration or iteration that may also be combined with broadening a convergence condition may be applied to obtain a similar or acceptable inverse blurring function G.

Since $H \otimes G = 1$, the inverse blurring function G is associated with the optical parameters of the camera, the position of the out-of-focus object and the position of the in-focus object. For example, the in-focus object in the original image and the 3D depth of the out-of-focus object may be identified by the post-imaging software (i.e., the image processing method) of the present invention to serve as positions of the two from the camera lens. According to the optical parameters, such as the aperture and exposure time used in the photographing for generating the original image, the inverse blurring function G for an out-of-focus object may be directly provided through a look-up table or an algorithm equation.

In another embodiment, the post-imaging software may first obtain the blurring function H according to the 3D depths, apertures and exposure times of the in-focus object and the out-of-focus object, and then reversely deduce the inverse blurring function G. To obtain the blurring function H, according to different variable combinations of the 3D depths, apertures and exposure times of the in-focus object and the out-of-focus object, numerous reference blurring functions may first be established through sequentially and actually capturing and measuring by a camera lens. In the actual post-imaging process, a closest reference blurring function $H_{REF}$ is first identified from the pre-established reference blurring functions, and a most appropriate blurring function H is calculated through interpolation or extrapolation. With the blurring function H, the inverse blurring function G can be calculated by solving simultaneous equations.

In an alternative embodiment, the inverse blurring function G need not necessarily be known. As previously described, given the 3D depths of the in-focus object and the out-of-focus object and the optical characteristics (e.g., the aperture of the lens and exposure time) of a camera lens, the blurring function H can be established or known. Using the post-imaging software according to an embodiment of the present invention, an initial figure may be first provided. The initial figure is then processed by the blurring function H to generate a result figure. With a mathematical analysis approach, the initial figure can be changed to have the result figure get more and more similar to the original figure in the original image. When a difference between the result figure and the original figure gets smaller to a predetermined level, the initial figure and other figures in the original image are combined into a simulated image. Thus, the operation of the inverse blurring process is similarly achieved.

Different applications of the present invention are to be described. With the post-imaging software according to an embodiment of the present invention, apart from obtaining the simulated image combined from the simulated figure that is obtained through the inverse blurring process, the post-imaging software may further simulate a characteristic that is unrelated to the capturing lens, and the simulated image generated the first time may be further simulated according to a blurring function H that is unrelated to the capturing lens. Such further simulation may be performed on certain figures selected from the simulated image. More specifically, a blurring process is performed on the selected certain figures from the simulated image according to the blurring function H that is unrelated to the capturing lens to generate bokeh effects, and the figures with bokeh effects are recombined to form another simulated image.

Figure 6:
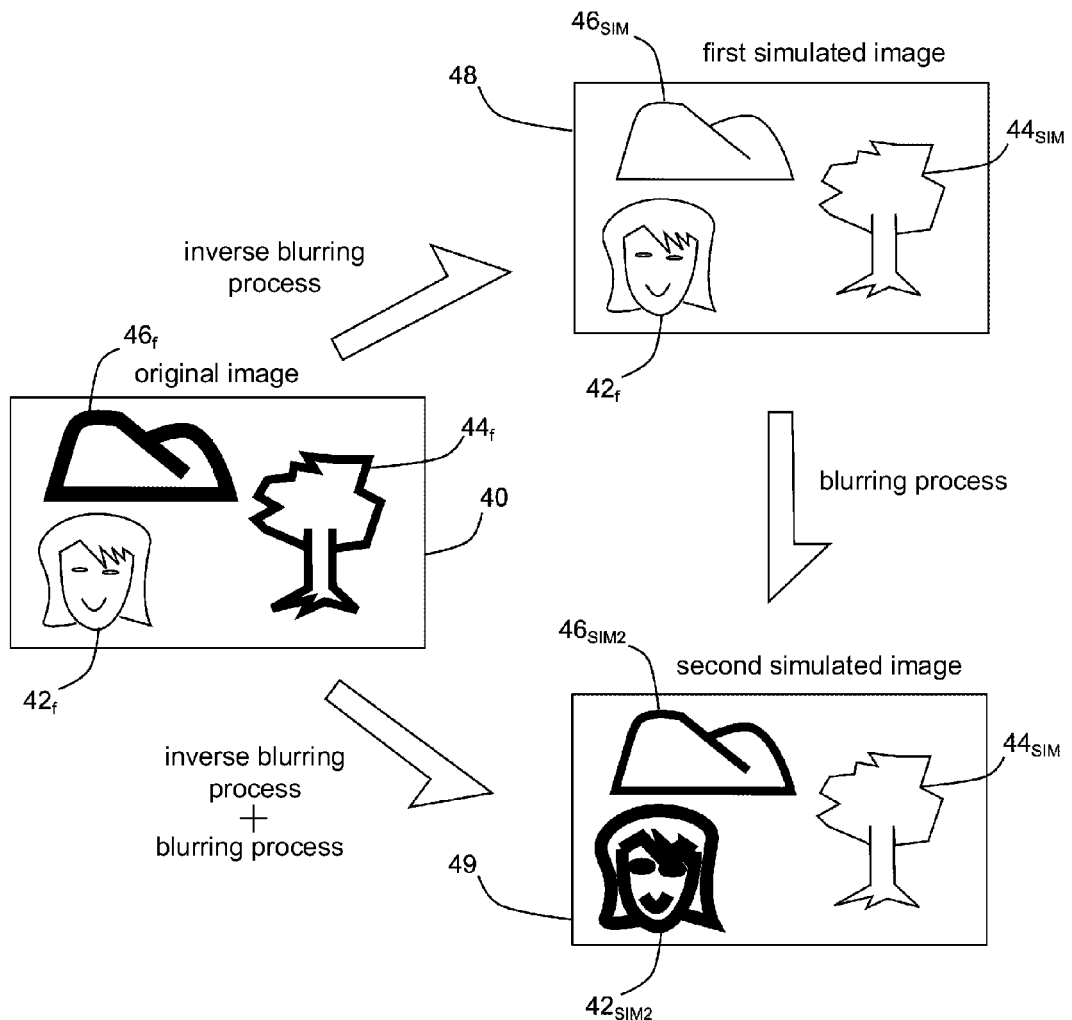
FIG. 6 shows some applications according to an embodiment of the present invention.

Taking FIG. 6 for example, the inverse blurring process may render the tree figure $44_f$ and the distance mountain figure $46_f$ in the original image 40 to be distinct to form the simulated image 48. The post-imaging software may further simulate another lens having a different focal length and utilize another set of optical parameters to virtually change the tree 44 to the in-focus object, and perform two different blurring processes on the simulated distance mountain figure $46_{SIM}$ and the original face figure $42_f$ in the simulated image 48 to generate a simulated distance mountain figure $46_{SIM2}$ and an indistinct simulated face figure $42_{SIM2}$. The simulated distance mountain figure $46_{SIM2}$ and the indistinct simulated face figure $42_{SIM2}$ are then combined with the simulated tree figure $44_{SIM}$ to obtain a simulated image 49. For example, according to another set of optical parameters, the distance $S_{42}$ from the face 42 (the original in-focus object) to the lens, and the distance $S_{44}$ from the tree 44 to the lens, the corresponding blurring function may be determined. The original face figure $42_f$ in the simulated image 48 is processed by the blurring process according to the blurring function to generate the simulated face figure $42_{SIM2}$ in the simulated image 49.

In another embodiment, the post-imaging software may directly combine the inverse blurring processing related to the capturing lens and the blurring process unrelated to the capturing lens, and directly provide effects that may be generated for the original image 40 after lens conversion. In other words, the post-imaging software according to an embodiment of the present invention is capable of directly performing a simulation/conversion process on the face figure $42_f$, the tree figure 44$_f$ and the distance mountain 46$_f$ in the original image 40 to generate the simulated face figure 42$_{SIM}$, the simulated tree figure 44$_{SIM}$ and the simulated distance mountain figure 46$_{SIM}$, as shown in FIG. 6.

Details of an anti-shift process are to be described. During an exposure, when the camera causes a shift due to a hand vibration, an issue of indistinctness may also be resulted in the original image. The imaging post-production according to an embodiment of the present invention is capable of converting certain indistinct figures in the original image into more distinct simulated figures according to a shift amount of the camera, the position of the photographed object and the optical parameters of the camera. The simulated figures may be combined with certain original figures in the original image to form a simulated image.

An indistinct original image caused by the shift of the camera may also be regarded as a result of performing a blurring process on a virtual distinct image without a shift according to a blurring function H. Therefore, equation (1) is also applicable to such conditions, as below:

$$P_{REAL} = P_{SHARP} \otimes H$$

In the above equation, $P_{SHARP}$ is regarded as a pixel array expectedly presented at the optical sensor for a photographed object in a situation without a shift in the camera; $P_{REAL}$ is an original pixel array presented on the optical sensor for a photographed object in a situation with a shift in the camera. For example, $P_{SHARP}$ is an in-focus image formed by a dot light source, and is represented as a 5×5 matrix below:

$$P_{SHARP} = \begin{bmatrix} 0 & 0 & 0 & 0 & 0 \\ 0 & 0 & 0 & 0 & 0 \\ 0 & 0 & 1 & 0 & 0 \\ 0 & 0 & 0 & 0 & 0 \\ 0 & 0 & 0 & 0 & 0 \end{bmatrix}$$

With the presence of the shift in the camera, the original pixel array $P_{REAL}$ of the image formed is represented as below:

$$P_{REAL} = \frac{1}{9} \begin{bmatrix} 0 & 0 & 0 & 0 & 0 \\ 0 & 0 & 0 & 0 & 0 \\ 0 & 2 & 3 & 3 & 1 \\ 0 & 0 & 0 & 0 & 0 \\ 0 & 0 & 0 & 0 & 0 \end{bmatrix}$$

It is deduced that the current blurring function H is:

$$H = \frac{1}{9} \begin{bmatrix} 0 & 0 & 0 & 0 & 0 \\ 0 & 0 & 0 & 0 & 0 \\ 0 & 2 & 3 & 3 & 1 \\ 0 & 0 & 0 & 0 & 0 \\ 0 & 0 & 0 & 0 & 0 \end{bmatrix}$$

The above blurring function H, in addition to the optical parameters of the camera, the position of the light dot source and the position of the optical sensor, is also associated with the shift amount "Shift" of the camera.

As previously stated, given the inverse function (i.e., the inverse blurring function G) of the blurring function H, the original pixel array $P_{REAL}$ may be processed by the inverse blurring function G to obtain a simulated pixel array $P_{SIM\text{-}GUESS}$, which is expectedly similar to the distinct pixel array $P_{SHARP}$. It should be noted that, without the inverse function of the blurring function H, the simulated pixel array $P_{SIM\text{-}GUESS}$ may also be deduced and generated by a mathematical analysis approach that employs the blurring function H and numerical analysis. The simulated pixel array $P_{SIM\text{-}GUESS}$ may replace the original pixel array $P_{REAL}$ to form a more distinct simulated image.

For the blurring function H or the inverse blurring function G identified based on the shift amount of the camera, the shift amount "Shift" of the camera is required as an input. For example, a horizontal and vertical displacement sensor is equipped in a camera to determine the shift amount "Shift" of the camera during the exposure. In one embodiment of the present invention, the post-imaging software may identify a blurring function H according to the optical parameters of the capturing lens, the position of an indistinct figure corresponding to the photographed object from the capturing lens, and the position of the optical sensor and the shift amount "Shift" of the camera, and then reversely deduce the inverse blurring function G. The post-imaging software may then perform an inverse blurring process on the indistinct figure according to the inverse blurring function G to obtain a simulated figure. The simulated figure may be combined with another simulated figure or an original figure in the original image to form a simulated image.

Figure 7:
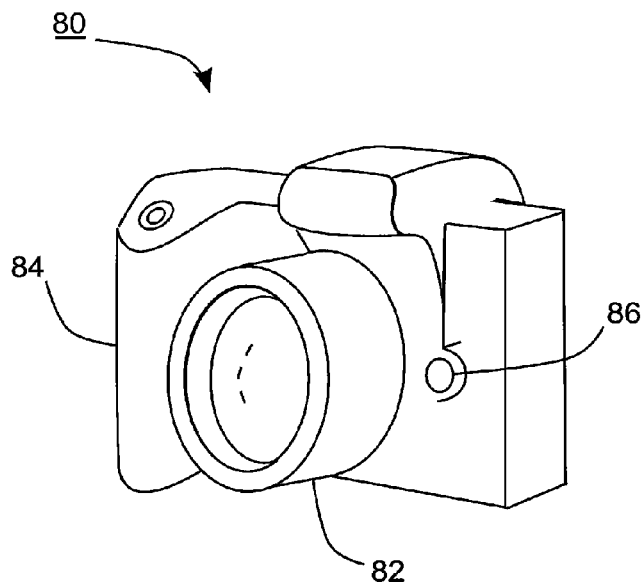
FIG. 7 is a digital camera according to an embodiment of the present invention.

Details of the implementation of the device are to be described. In one embodiment, the above image processing method may be applied to a digital camera, as shown in FIG. 7. A digital camera 80 includes a lens 82 mounted on a camera body 84. The camera body 84 includes a distance detecting unit 86 that detects a distance from a photographed object located in front of the digital camera 80 to the digital camera 80.

Figure 8:
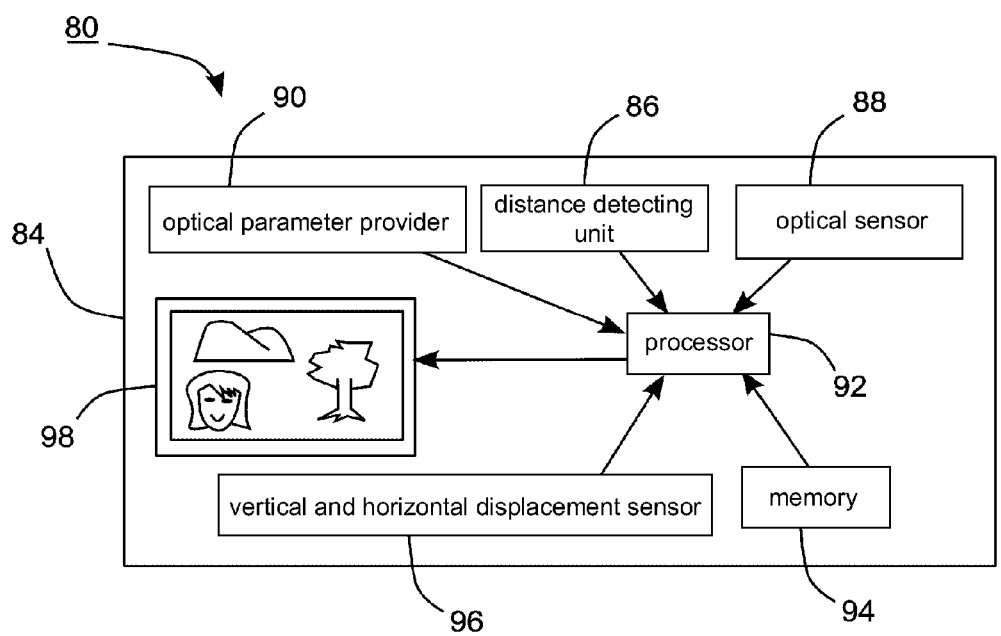
FIG. 8 is a functional block of the digital camera in FIG. 7.

FIG. 8 shows a functional block diagram of elements in the digital camera 80 in FIG. 7. The digital camera 80 includes a distance detecting unit 86, an optical sensor 88, an optical parameter provider 90, a processor 92, a memory 94, a horizontal and vertical displacement sensor 96, and a screen 98.

After the digital camera photographs an object in front by the lens 82, the optical sensor 88 may be an image sensor that provides an original image. The distance detecting unit 86 may provide the processor 92 with associated information to learn object distances from the photographed objects corresponding to the pixels in the original image to the digital camera 80. According to contrast in the original image and distance data provided by the distance detecting unit 86, the processor 92 identifies distinct figures and indistinct figures in the original image. The objects corresponding to the distinct figures are referred to as in-focus objects, and the objects corresponding to the indistinct figures are referred to as out-of-focus objects.

In one embodiment, the optical parameter provider 90 provides optical parameters such as the focal length and aperture of the lens 82. As previously stated, according to these optical parameters as well as object distances of the distinct figures and indistinct figures, the processor 92 may obtain the blurring function H according to which the indistinct figures are generated and the corresponding inverse blurring function G. The processor 92 may perform an inverse blurring process on the indistinct figures according to the inverse blurring function G to obtain a simulated figure. After combining the simulated figure with the distinct figure, the processor 92 may obtain a simulated image, and display the simulated image on the screen 98.

In one embodiment, the memory 94 records reference inverse blurring functions $G_{REF}$ respectively corresponding combinations of different optical parameters and the different distance data. The processor 92 selects one or two most appropriate reference inverse blurring functions $G_{REF}$ from numerous reference inverse blurring functions $G_{REF}$ according to the optical parameters as well as the object distances of the distinct figure and indistinct figure, and obtains the inverse blurring function G corresponding to the indistinct figure by interpolation or extrapolation.

In an alternative embodiment, the memory 94 records reference blurring functions $H_{REF}$ respectively corresponding combinations of different optical parameters and the different distance data. The processor 92 selects one or two most appropriate reference blurring functions $H_{REF}$ from numerous reference blurring functions $H_{REF}$ according to the optical parameters as well as the object distances of the distinct figure and indistinct figure, obtains the blurring function H that the indistinct figure expectedly underwent by interpolation or extrapolation, and reversely deduces the inverse blurring function G corresponding to the indistinct figure.

In one embodiment, the distance detecting unit 86 may be an infrared distance detecting unit. In another embodiment, the distance detecting unit 86 may be another lens that provides another original image having a resolution lower than that of the original image provided by the optical sensor 88. The processor 92 compares the two original images, and obtains the 3D depth therein to serve as an object distance.

The horizontal and vertical displacement sensor 96 provides a shift amount "Shift" encountered by the digital camera 80 when the optical sensor 88 generates the original image. According to the shift amount "Shift", the object distance of the figure in the original image and the optical parameters of the lens 82, the processor 92 may obtain the blurring function H that the indistinct figure in the original image underwent and the corresponding inverse blurring function G. After performing the inverse blurring process according to the blurring function H or the inverse blurring function G, the processor 92 obtains a simulated figure. The processor 92 then combines the simulated figure with the distinct figure to obtain a simulated image, and displays the simulated image on the screen 98.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image editing method, for editing an original image derived from an image capture apparatus comprising an aperture, a lens, and an optical sensor, the original image at least having a distinct figure and an indistinct figure respectively corresponding to an in-focus object and an out-of-focus object, the image editing method comprising:
   obtaining an out-of-focus object distance from the out-of-focus object to the lens;
   performing an inverse blurring process on the indistinct figure according to the out-of-focus object distance and an optical parameter to obtain a processed figure, said performing the inverse blurring process comprising:
      obtaining a blurring convolution function according to a focal length of the lens, the aperture, the out-of-focus object distance and the position of the optical sensor;
      deducing an inverse blurring function according to the blurring convolution function; and
      processing the indistinct figure according to the inverse blurring function to obtain the processed figure; and
   forming a processed image according to the processed figure and the distinct figure, comprising:
      forming said processed image containing the processed figure and the distinct figure by replacing the indistinct figure in the original image with the processed figure.

2. The image editing method according to claim 1, wherein the step of obtaining the inverse function comprises:
   providing a plurality of reference blurring functions; and
   selecting one reference blurring function from the reference blurring functions according to the out-of-focus object and the optical parameter, and accordingly determining the blurring function.

3. The image editing method according to claim 1, wherein the step of performing the inverse blurring process on the indistinct figure to obtain the processed figure comprises:
   determining a blurring function according to the out-of-focus object distance and the optical parameter;
   providing an initial figure;
   performing a blurring process on the initial figure according to the blurring function to obtain a result figure;
   adjusting the initial figure to render the result figure to be similar to the indistinct figure; and
   utilizing the initial figure as the processed figure.

4. The image editing method according to claim 3, wherein the blurring process is an inverse function of the inverse blurring process.

5. The image editing method according to claim 1, wherein the original image is a first original image, and the step of obtaining the out-of-focus object distance comprises:
   obtaining a second original image; and
   obtaining the out-of-focus object distance according to the first and second original images.

6. The image editing method according to claim 1, wherein the step of obtaining the out-of-focus object distance comprises:
   transmitting electromagnetic waves to the out-of-focus object by a distance detecting unit to detect the out-of-focus object distance.

7. The image editing method according to claim 1, wherein the processed image is a first processed image, the image editing method further comprising:
   obtaining an in-focus object distance from the in-focus object to the lens; and
   performing a blurring process on at least a part of the processed image according to the in-focus object distance and another optical parameter to obtain a second processed image.

8. An image processing apparatus, configured to process an original image generated by photographing, comprising:
   an image capture apparatus, comprising:
      an aperture;
      a lens; and
      an optical sensor;
   a processor, configured to identify a distinct figure and an indistinct figure from the original image, the distinct figure and the indistinct figure respectively corresponding to an in-focus object and an out-of-focus object photographed; and
   a distance detecting unit, configured to obtain an out-of-focus object distance from the out-of-focus object to the lens;

wherein the processor is configured to perform an inverse blurring process on the indistinct figure according to the out-of-focus object distance and an optical parameter of the lens to obtain a processed figure, said performing the inverse blurring process comprises obtaining a blurring convolution function according to a focal length of the lens, the aperture, the out-of-focus object distance and the position of the optical sensor; deducing an inverse blurring function according to the blurring convolution function; and processing the indistinct figure according to the inverse blurring function to obtain the processed figure, and the processor is configured to form a processed image according to the processed figure and the distinct figure, comprising: forming said processed image containing the processed figure and the distinct figure by replacing the indistinct figure in the original image with the processed figure.

9. The image processing apparatus according to claim 8, further comprising a memory storing a plurality of reference blurring functions; wherein, the processor selects a reference blurring function from the reference blurring functions according to the out-of-focus object distance and the optical parameter, and accordingly determines a blurring function.

10. The image processing apparatus according to claim 9, wherein the processor deduces an inverse blurring function according to the blurring function, and performs the inverse blurring process on the indistinct figure according to the inverse blurring function to obtain the processed figure.

11. The image processing apparatus according to claim 9, wherein the processor provides and adjusts an initial figure, and renders a result figure obtained from processing the initial figure by the blurring function to be similar to the indistinct figure, and utilizes the initial figure as the simulated figure.

12. The image processing apparatus according to claim 8, further comprising a memory storing a plurality of reference blurring functions; wherein, the processor performs the inverse blurring process on the indistinct figure according to one of the reference inverse blurring functions, the optical parameter and the out-of-focus object distance to obtain the processed figure.

13. The image processing apparatus according to claim 8, wherein the distance detecting unit renders the processor to obtain another original image, and the processor obtains the out-of-focus object distance according to the another original image.

14. The image processing apparatus according to claim 8, further comprising a displacement sensor configured to provide a shift amount of the lens.

15. The image processing apparatus according to claim 14, wherein the processor performs the inverse blurring process on the indistinct figure according to the out-of-focus object distance, the optical parameter and the shift amount to obtain the processed figure.

16. The image editing method according to claim 1, wherein said blurring convolution function is $$H(f, A, S_p, S_{sharp}) = 1/29 \times \begin{bmatrix} 0 & 0 & 1 & 0 & 0 \\ 0 & 2 & 3 & 2 & 0 \\ 1 & 3 & 5 & 3 & 1 \\ 0 & 2 & 3 & 2 & 0 \\ 0 & 0 & 1 & 0 & 0 \end{bmatrix}$$

where f, A, $S_p$ and $S_{sharp}$ represent the focal length, the aperture, the position of the dot light source, and the position of optical sensor, respectively.

* * * * *